(12) United States Patent
Rector

(10) Patent No.: US 7,524,448 B2
(45) Date of Patent: Apr. 28, 2009

(54) HONEYCOMB EXTRUSION DIE

(75) Inventor: John Charles Rector, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 751 days.

(21) Appl. No.: 11/135,738

(22) Filed: May 23, 2005

(65) Prior Publication Data
US 2006/0103043 A1    May 18, 2006

Related U.S. Application Data

(60) Provisional application No. 60/628,898, filed on Nov. 17, 2004.

(51) Int. Cl.
*B29C 47/12* (2006.01)
(52) U.S. Cl. ............... 264/177.12; 425/462; 425/464; 425/467
(58) Field of Classification Search ............... 264/40.7, 264/177.11, 177.12; 425/382 R, 380, 461–467
See application file for complete search history.

(56) References Cited

U.S. PATENT DOCUMENTS

| | | | | |
|---|---|---|---|---|
| 3,881,984 A | * | 5/1975 | Soda et al. .................. | 156/500 |
| 4,343,604 A | * | 8/1982 | Minjolle .................. | 425/192 R |
| 4,384,841 A | * | 5/1983 | Yamamoto et al. .......... | 425/461 |
| 4,461,323 A | * | 7/1984 | Morikawa et al. ........... | 138/115 |
| 4,550,005 A | * | 10/1985 | Kato ..................... | 264/177.12 |
| 4,915,612 A | | 4/1990 | Gangeme et al. ............ | 425/464 |
| 4,979,889 A | * | 12/1990 | Frost ..................... | 425/192 R |
| 6,039,908 A | * | 3/2000 | Brew et al. ............. | 264/177.12 |

* cited by examiner

*Primary Examiner*—Jill L Heitbrink
(74) *Attorney, Agent, or Firm*—Joseph M. Homa

(57) ABSTRACT

The invention discloses method and apparatus for providing a desired batch flow through desired regions of an extrusion die for forming honeycomb structures, and more particularly to the enhancement of batch flow in the skin-forming region of the die so as to provide a bounding wall of desired thickness and strength about a honeycomb core. Unlike prior methods, a recess or trough of desired depth and width is formed in a desired region of the inlet face of the honeycomb die, which reduces the pressure required to flow batch material through the die in such region. Such reduced pressure requirement translates in an increased flow rate in such region under constant extrusion pressure. Thus by increasing the flow rate through a honeycomb extrusion die in an outer peripheral region of flow in this manner, improved skin formation around a honeycomb core is obtained during the forming process.

15 Claims, 2 Drawing Sheets

HONEYCOMB EXTRUSION DIE

This application claims the benefit of U.S. Provisional Application No. 60/628,898, filed Nov. 17, 2004, by J. Rector.

BACKGROUND OF THE INVENTION

Honeycomb extrusion dies are commonly used to form cellular or honeycomb ceramic substrates for use in catalytic converters, which are utilized in exhaust systems of internal combustion engines. In order to reduce back pressure within the exhaust system, it is necessary that the cell walls or webs of the substrate have a substantially thin cross-sectional dimension so as to provide a substantially large open frontal area. However, the thin walled structure must be protected so as to withstand normal automotive impact requirements. One way to protect the inner cell walls is to provide an outer skin of increased thickness, thus providing additional strength to withstand external loads.

The present invention relates to honeycomb die designs, and more particularly to die designs offering improved control over the delivery of plasticized powdered ceramic batch materials toward the skin-forming regions of such dies, in order to better control the thicknesses and flow properties of the co-extruded skin layers needed to effectively surround and protect the honeycomb core portions of the extruded honeycomb structures.

Current methods of providing a sufficient flow of skin-forming ceramic material on extruded ceramic honeycombs have involved modifications of the pin or outlet side of the extrusion die. Generally, such methods comprise the cutting away of material from the pin side of the die and/or attaching throttling plates to the inlet side of the die bodies to provide a thick, smooth skin area on the extruded part. U.S. Pat. Nos. 5,219,509 to Cocchetto et al and 6,455,124 B1 to Beall et al are representative of such methods. Also U.S. Pat. No. 4,915,612 to Gangeme et al utilizes a mask associated with the discharge face of the die and a forming plate positioned on the inlet face of the feed holes to produce an outer skin on a honeycomb substrate.

However, many of these know methods are subject to various handling and extrusion problems, including damaging the die pins during the cutting away process which renders the die completely useless. Partial pins, formed by a square cell pattern when being cut by a rounded skin pattern, are subject to excessive wearing. Also, the cutting of the pin surface results in a variable surface finish on the completed die, which produces changing extrudate flow rates as the die is slowly eroded by the flow of abrasive batch through the die. Also of concern are variations in flow from one die to the next, which can cause high variability in selects between dies and therefore reduced material utilization in the forming plants. Further, where such variations in flow exist, the ceramic skins are not always well adhered to the honeycomb core portions of the extruded parts.

It is known to increase the flow of skin-forming material by widening the discharge slots in the outer skin-forming region to improve the wet strength of the formed part and to provide improved adherence of the skin on the ceramic honeycomb part. Such widening techniques, however, are expensive in terms of tooling and machine time. Further, the necessary machining is irreversible. That is, the die cannot be re-converted to a uniform slot width design, which may be necessary due to surface finish wear that eventually results in excessive flow of batch material in the skin-forming region.

SUMMARY OF THE INVENTION

The present invention relates to novel die designs wherein die modifications effective to provide skin-forming and other flow control enhancements involve the removal of die material from the batch inlet or feedhole side of the extrusion die. Such modifications may be used alone or in combination with current slot-modification technics, typically employed at the pin or outlet side of the die. The removal of material from the feedhole side of the die produces a shallow trough or recess which reduces the pressure required to flow extrudate through the die in such area. The reduced pressure requirement translates in an increased flow rate in such area under constant extrusion pressure. Thus this invention provides an improved manner to increase flow through a honeycomb extrusion die in an outer peripheral region of flow which is utilized to create a skin around the honeycomb substrate during the forming process, while under constant extrusion pressure.

The removal of die material from the feedhole side of the extrusion die in the skin-forming region utilizes the basic physics of batch flow through the die, to improve and control extrudate flow in and adjacent to that region. In view of the fact that the length of the feed hole impacts the extrusion pressure, by varying the feedhole length, the amount of wall drag experienced by the extrusion material in the feed holes can be controlled, resulting in increased batch flow through those feedholes which are formed shorter than adjacent feedholes. A desired feedhole length for improving flow to the skin-forming portion of the die may be conveniently obtained by cutting a shallow trough or recess in the batch inlet or feedhole side of the die, in a narrow portion of the skin-forming region. Also, the conventional pin side modifications may be made to the die.

The extent of enhancement of batch flow through the skin-forming region of the die is easily controlled by varying the depth and shape of the trough formed in the inlet surface of the die. Further, the width of the trough can be varied about the central axis of the die to adjust for inconsistencies in radial flow existent in various extrusion equipment.

A particular advantage obtained by utilizing a trough or recess on the inlet side of a honeycomb extrusion die to control the flow of skin-forming batch is that when the trough is no longer necessary to provide the enhanced flow to the skin-forming region, the inlet face of the die may be machined smooth to remove the trough and the die reused. Also, the inlet face may be machined to provide a different inlet face configuration, which may be useful in controlling batch feed through the skin-forming and adjacent portions of the extrusion die for a different purpose.

It thus has been an object of the present invention to provide novel method and apparatus for controlling the flow of skin-forming batch material through an extrusion die so as to improve the formation of a bounding skin about a honeycomb core.

A further object of the invention has been to provide a honeycomb extrusion die having a recess in its feedhole face for facilitating the control of flow of batch material to a skin-forming region of the die, wherein the feedhole face may be re-machined and reused.

DESCRIPTION OF THE PREFERRED
EMBODIMENTS OF THE INVENTION

Figure 1:
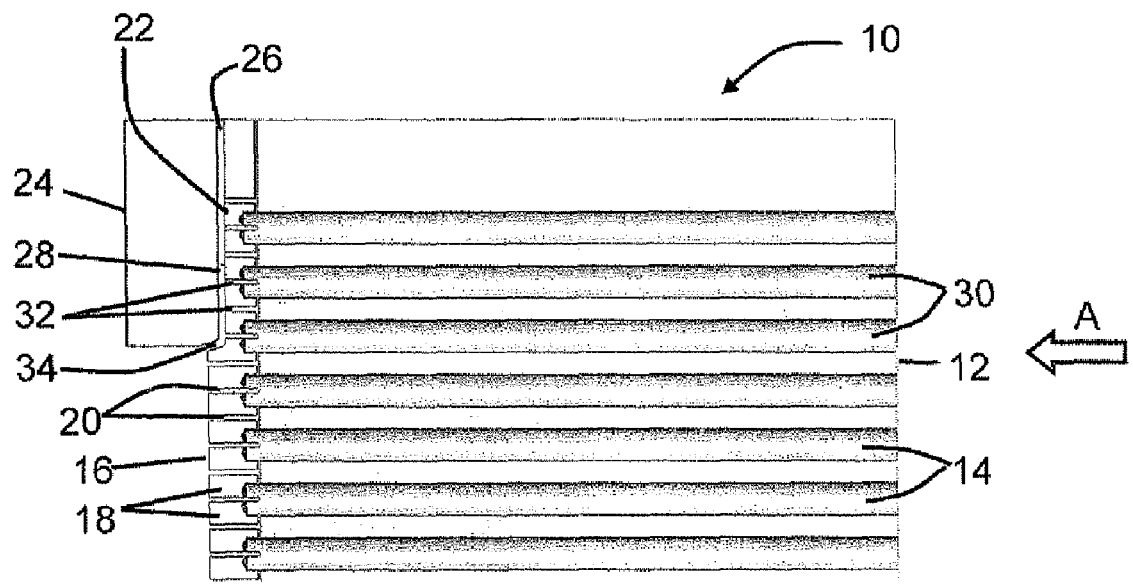
FIG. 1 is a schematic cross-sectional view of a prior art extrusion die.

Referring now to the drawings, FIG. 1 illustrates a prior art extrusion die wherein a portion of the outlet pin face is cut away. The die 10 has an inlet or feedhole face 12 open to a plurality of feedholes 14 and an outlet or pin face 16 having a plurality of pins 18 surrounded by discharge slots 20. A portion of the outlet face 16, adjacent an outer skin-forming region, is cut away at 22. A mask or skin-forming ring 24, spaced from the die 10 by a shim 26, overlies the cut away portion 22. The ring or mask 24 forms a reservoir 28 in the cut away portion 22, between the mask and the die, which is fed with batch material from feed holes 30 and reduced slots 32, when plasticized batch material (not shown) is caused to flow in the direction of arrow A. The material collected in reservoir 28 flows out through a skin-forming gap 34 as a skin layer on a honeycomb core concurrently formed from plasticized batch material that is discharged from slots 20 not covered by skin-forming ring 24.

In order to modify the thickness of the skin and/or the web structure exiting the die, it is conventional to modify the widths of selected slots, such as slots 32 and/or modify the width of the skin-forming gap 34. Generally such openings are enlarged to locally increase batch flow in such areas. However, as noted above, such modifications are irreversible and therefore when the dies are so modified, once worn, they cannot be reconditioned for further use.

Figure 2:
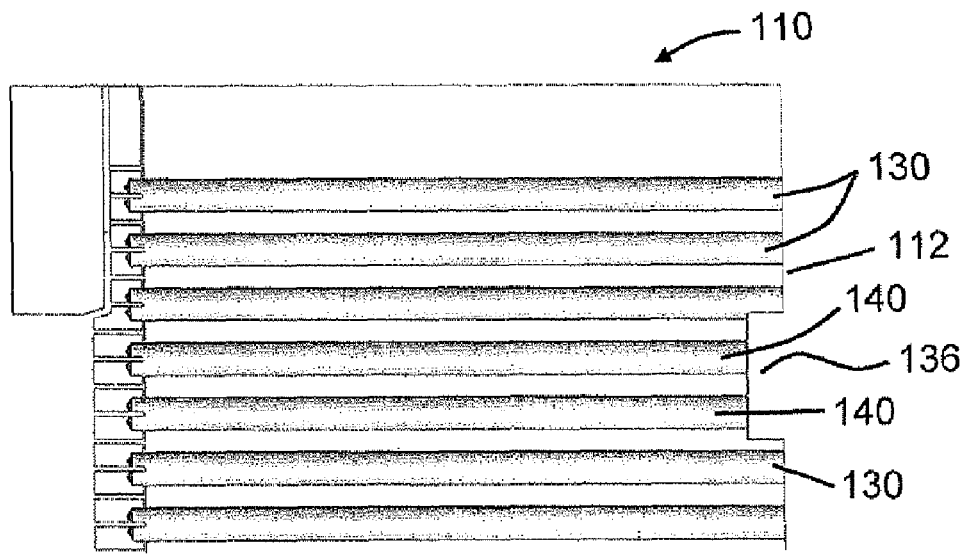
FIG. 2 is a schematic cross-sectional view of an extrusion die embodying the present invention.

FIG. 2 illustrates a die 110, similar to die 10, but modified in accordance with the present invention. As shown, a recess or trough 136 is formed in the inlet or feedhole face 112 of the die 110 within the skin-forming region of the die. Material removal to form the trough 136 may be effected by any suitable means, however, plunge electrical discharge machining (EDM) produces a preferred burr-free method of material removal. The trough 136 is in communication with selected skin-forming feedholes 140, and accordingly reduces the longitudinal extent of such feedholes. It thus is apparent that due to the recess or trough 136 formed in the inlet face 112, the longitudinal extent of feedholes 140 is shorter than that of adjacent feedholes 130. Accordingly, wall drag on batch material flowing through shortened feedholes 140 is proportionately reduced with respect to that in standard feedholes 130, and thus batch flow through such shortened feedholes is increased and greater than that flowing through standard holes 130, so as to provide a controlled flow of skin-forming batch material. The depth and/or the radial extent of the trough 136 can be varied so as to adjust the increase of extrudate flow through the shortened feed holes 140 to a predetermined level as may be desired for the thickness of the bounding skin to be formed about the honeycomb core simultaneously formed by the die 110.

Figure 3:
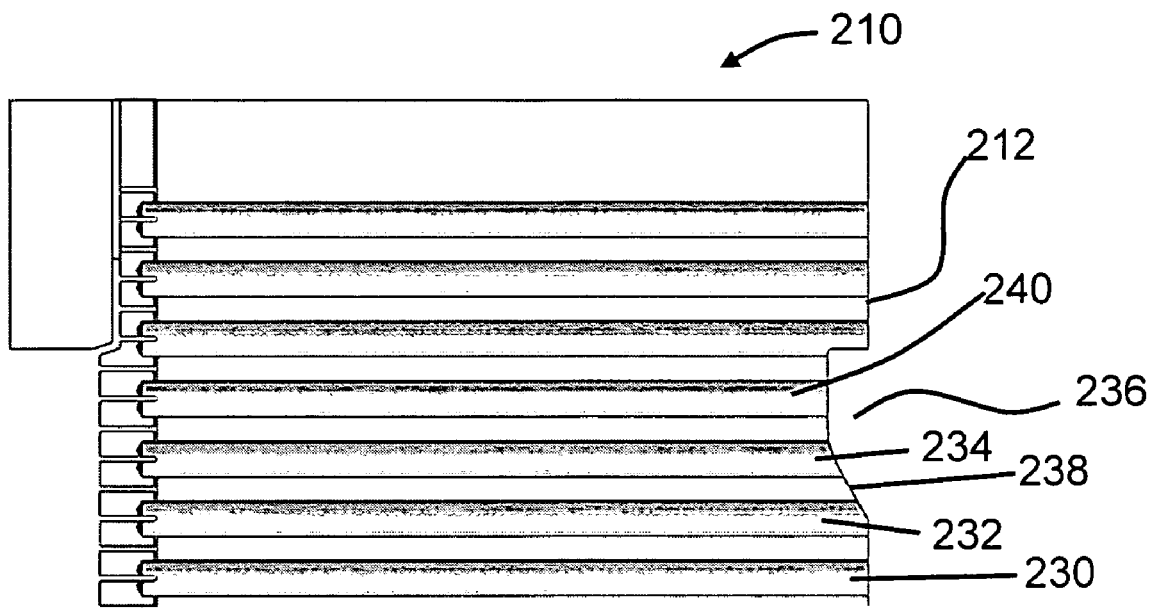
FIG. 3 is a schematic cross-sectional view of a further embodiment of the invention.

For even further control of batch flow rates through a honeycomb extrusion die, the shape and depth of the trough may be varied in the radial direction, and/or the width of the recess may be varied about the periphery of the die. FIG. 3 shows a further embodiment of the invention wherein die 10 is modified by forming a recess or trough 236 of variable cross-section in the inlet or feedhole face 212 to form an improved batch flow control die 210. The variably shaped cross-section and preselected width and depth of recess 236 are functions of radial location about the central longitudinal axis through the die and the desired radius from such axis. This complex shape of trough 236 including slanted wall 238 provides the ability to transition the flow of batch material from the thinner inner webs of the honeycomb core to thicker or heavier outer webs adjacent the peripheral wall where the actual skin region is joined.

To illustrate the controlled varied flow of batch material through extrusion die 210, shortened feedhole 240 at the innermost extent of recess 236 will have the least amount of batch wall drag and accordingly will facilitate the best flow rate through the die for providing a desired skin thickness. Feedhole 234, which is shortened by an inner lower end of slant wall 238, will produce a batch flow rate slightly less than that of feed hole 240, but more than that provided by feedhole 232 at an outer upper end of slant wall 238. Finally, standard feedholes 230 will produce the most wall drag on the batch flow and accordingly will have the least amount of flow rate to the discharge end of the die 210. Since the flow rate of the batch is directly proportional to the web thickness produced by the die, it can be seen that the slant wall 238 gradually increases the web thickness toward the periphery of the extruded honeycomb structure and that the inner surface of the recess 236 facilitates the production of a bounding skin of desired thickness.

Figure 4:
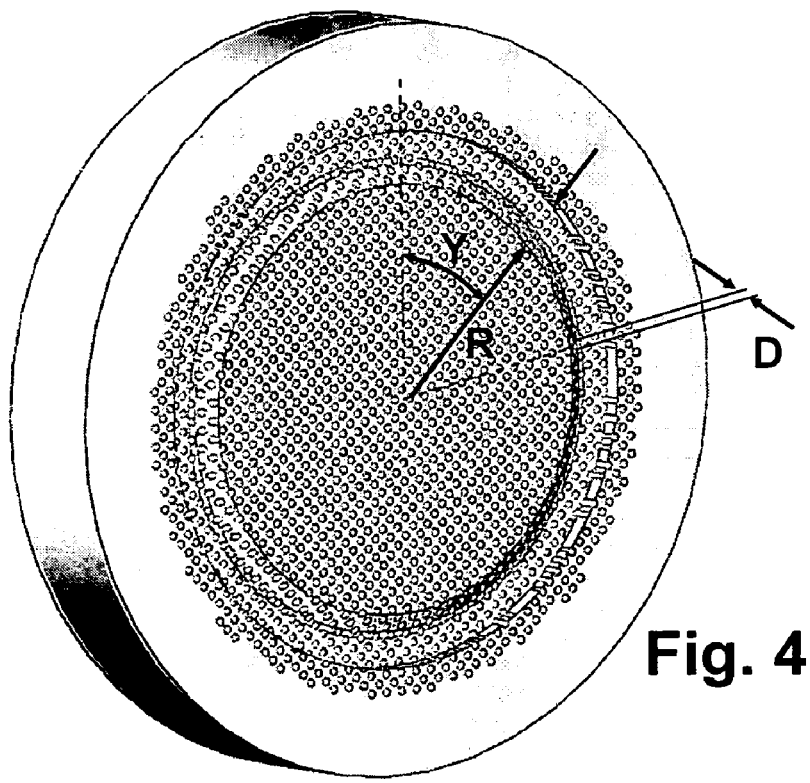
FIG. 4 is a view of the inlet or feedhole side of a die embodying the present invention.

Referring now to FIG. 4, the inlet or feedhole side of an extrusion die is shown having an annular recess or trough which is provided with a variable depth D and width W around its extent with respect to angle Y to provide an adjustment to batch flow depending on local equipment flow variation. For example, some extrusion systems may generate more or less flow pressures against the extrusion die as a function of the radial angle Y, depending on the hardware employed. Further, as shown, the depth D of the trough may also be varied as a function of radius R to generate a taper or slant wall into and /or out of the cutout area. The variable wall provides for a smooth transition from the internal portion of the die to the recessed area and then back to face of the die adjacent the skin area.

As previously noted, the inlet face modifications of the present invention may be utilized alone or in combination with other known skin-forming measures.

Although the now preferred die configurations of the invention have been disclosed, it will be apparent to those skilled in the art that various changes and modifications may be made thereto without departing from the spirit and scope thereof as defined in the appended claims.

I claim:

1. A method of manufacturing a honeycomb structure with an outer skin, the method comprising:

extruding plasticized batch material through a die apparatus comprised of an extrusion die, a mask, and a shim, the extrusion die having an inlet face and an outlet face, the outlet face comprising an outer skin-forming region and an inner region, the mask being disposed proximate the outer skin-forming region of the outlet face of the die, the shim being disposed between the outlet face of the die and the mask, thereby spacing the mask away from the die, the mask and the outlet face of the die defining a skin-forming gap therebetween, the outlet face comprising a plurality of pins spaced apart by a plurality of discharge slots, the inlet face comprising a plurality of feedholes in communication with the plurality of discharge slots, the inlet face comprising a non-recessed surface and a recessed surface, wherein at least one feedhole in the recessed surface is in communication with at least one discharge slot that terminates in the skin-forming gap or with at least one discharge slot that is disposed directly adjacent to the skin-forming gap.

2. The method of claim 1 wherein the outlet face of the die comprises a cut-away portion disposed opposite the mask, thereby defining a reservoir between the extrusion die and the mask.

3. The method of claim 2 wherein the plasticized batch material is capable of exiting the reservoir through the skin-forming gap.

4. The method of claim 1 wherein the recessed surface of the inlet face of the extrusion die has a variable depth.

5. The method of claim 1 wherein the holes in the recessed surface of the inlet face of the extrusion die are shorter than the holes in the non-recessed surface of the inlet face.

6. The method of claim 1 wherein the batch material is flowed under constant pressure to the inlet face of the extrusion die.

7. The method of claim 1 further comprising, after the batch material is extruded through the extrusion die, machining the inlet face to remove the recessed surface and to form another non-recessed surface, and forming another recessed configuration in the inlet face.

8. The method of claim 1 wherein the recessed surface varies in depth D about the die as a function of both a radial angle Y and a radius R.

9. The method of claim 1 wherein the recess has a variable width as a function of the angle Y.

10. An extrusion die apparatus for manufacturing a ceramic honeycomb structure with an outer skin, the apparatus being comprised of:

an extrusion die, a mask, and a shim, the extrusion die having an inlet face and an outlet face, the outlet face comprising an outer skin-forming region and an inner region, the mask being disposed proximate the outer skin-forming region of the outlet face of the die, the shim being disposed between the outlet face of the die and the mask, thereby spacing the mask away from the die, the mask and the outlet face of the die defining a skin-forming gap therebetween, the outlet face comprising a plurality of pins spaced apart by a plurality of discharge slots, the inlet face comprising a plurality of feedholes in communication with the plurality of discharge slots, the inlet face comprising a non-recessed surface and a recessed surface, wherein at least one feedhole in the recessed surface is in communication with at least one discharge slot that terminates in the skin-forming gap or with at least one discharge slot that is disposed directly adjacent to the skin-forming gap.

11. The apparatus of claim 10 wherein the outlet face of the die comprises a cut-away portion disposed opposite the mask, thereby defining a reservoir between the extrusion die and the mask.

12. The apparatus of claim 10 wherein the recessed surface of the inlet face of the extrusion die has a variable depth.

13. The apparatus of claim 10 wherein the holes in the recessed surface of the inlet face of the extrusion die are shorter than the holes in the non-recessed surface of the inlet face.

14. The apparatus of claim 10 wherein the recessed surface varies in depth D about the die as a function of both a radial angle Y and a radius R.

15. The apparatus of claim 10 wherein the recess has a variable width as a function of the angle Y.

\* \* \* \* \*